United States Patent
Alhanahnah et al.

(10) Patent No.: US 12,079,607 B2
(45) Date of Patent: Sep. 3, 2024

(54) COMPUTER IMPLEMENTED PROGRAM SPECIALIZATION

(71) Applicant: Wisconsin Alumni Research Foundation, Madison, WI (US)

(72) Inventors: Mohannad Alhanahnah, Madison, WI (US); Vaibhav Rastogi, Santa Clara, CA (US); Somesh Jha, Madison, WI (US); Thomas Reps, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 125 days.

(21) Appl. No.: 17/738,158

(22) Filed: May 6, 2022

(65) Prior Publication Data

US 2022/0357933 A1 Nov. 10, 2022

Related U.S. Application Data

(60) Provisional application No. 63/185,147, filed on May 6, 2021.

(51) Int. Cl.
*G06F 8/41* (2018.01)
*G06F 9/445* (2018.01)
*G06F 9/455* (2018.01)

(52) U.S. Cl.
CPC ............ *G06F 8/4443* (2013.01); *G06F 8/443* (2013.01); *G06F 8/452* (2013.01); *G06F 9/445* (2013.01); *G06F 9/45504* (2013.01)

(58) Field of Classification Search
CPC ...... G06F 9/45504; G06F 9/445; G06F 8/452; G06F 8/443
See application file for complete search history.

(56) References Cited

U.S. PATENT DOCUMENTS

| | | | | |
|---|---|---|---|---|
| 4,642,765 | A | * | 2/1987 | Cocke ................... G06F 8/443 717/153 |
| 4,667,290 | A | * | 5/1987 | Goss ....................... G06F 8/47 713/1 |
| 5,202,995 | A | | 4/1993 | O'Brien |
| 6,041,179 | A | * | 3/2000 | Bacon .................. G06F 9/4491 717/151 |
| 6,286,135 | B1 | * | 9/2001 | Santhanam ............ G06F 8/443 717/146 |
| 7,725,887 | B2 | | 5/2010 | Wu et al. |
| 9,436,449 | B1 | * | 9/2016 | Chandnani .......... G06F 11/3664 |
| 10,203,968 | B1 | | 2/2019 | Lawson |

(Continued)

OTHER PUBLICATIONS

Gregory Malecha et al.; "Automated software winnowing." In Proceedings of the 30th Annual ACM Symposium on Applied Computing, pp. 1504-1511. Apr. 2015 .; Spain.

(Continued)

*Primary Examiner* — Phillip H Nguyen
(74) *Attorney, Agent, or Firm* — Boyle Fredrickson, S.C.

(57) ABSTRACT

A computerized technique for program simplification and specialization combines a partial interpretation of the program based on a subset of program functions to obtain variable states with concrete values at a program "neck." These concrete values are then propagated as part of an optimization transformation that simplifies the program based on these constant values, for example, by eliminating branches that are never taken based on the constant values.

18 Claims, 3 Drawing Sheets

(56) References Cited

U.S. PATENT DOCUMENTS

| | | | |
|---|---|---|---|
| 2003/0188299 A1* | 10/2003 | Broughton | G06F 8/445 |
| | | | 717/141 |
| 2003/0229709 A1 | 12/2003 | Fraser | |
| 2005/0060696 A1* | 3/2005 | Bicsak | G06F 8/433 |
| | | | 717/156 |
| 2006/0005178 A1* | 1/2006 | Kilgard | G06T 15/005 |
| | | | 717/153 |
| 2006/0212863 A1 | 9/2006 | Warnes | |
| 2008/0178149 A1* | 7/2008 | Peterson | G06F 8/437 |
| | | | 717/110 |
| 2011/0119660 A1* | 5/2011 | Tanaka | G06F 8/4441 |
| | | | 717/149 |
| 2013/0125097 A1* | 5/2013 | Ebcioglu | G06F 30/323 |
| | | | 717/136 |
| 2016/0077831 A1* | 3/2016 | Mihalcea | H01L 27/088 |
| | | | 717/131 |

OTHER PUBLICATIONS

Hashim Sharif et al.; "TRIMMER: application specialization for code debloating." In Proceedings of the 33rd ACM/IEEE International Conference on Automated Software Engineering, pp. 329-339. Sep. 2018. France.

* cited by examiner

```
   Input: Pcc visitedFunc
   Output: P'
1  P' ← Pcc
2  /* Remove unused functions                                    */
3  CG ← constructCallGraph(P')
4  for func ∈ CG do
5  |   if func ∉ visitedFunc ∧ func is not an operand of
   |      other instructions then
6  |   |   remove func from P' and CG 7  for func ∈ CG do
8  |   if func is not an operand of other instructions then
9  |   |   remove func from P' and CG
10 |   |   remove func's descendent nodes from P' and CG if
   |   |      they are not reachable from main 11 /* Remove unused Global Variables                             */
12 for var ∈ getGlobalList(Pcc) do
13 |   if var is not an operand of other instructions then
14 |   |   remove var from P'

15 /* Remove unsed Stack Variables                               */
16 for func ∈ CG do
17 |   for inst ∈ func do
18 |   |   in inst is AllocInst then
19 |   |   |   if inst is not an operand of other instructions
   |   |   |      then
20 |   |   |   |   remove inst from P'
21 |   |   else if inst is a destination operand of only one
   |   |      storeInst then
22 |   |   |   remove storeInst from P'
23 |   |   |   remove inst from P'
```

FIG. 5

COMPUTER IMPLEMENTED PROGRAM SPECIALIZATION

CROSS REFERENCE TO RELATED APPLICATION

This application claims the benefit of U.S. provisional application 63/185,147 filed May 6, 2021 and hereby incorporated by reference.

STATEMENT REGARDING FEDERALLY SPONSORED RESEARCH OR DEVELOPMENT

This invention was made with government support under N00014-17-1-2889 awarded by the NAVY/ONR. The government has certain rights in the invention.

BACKGROUND OF THE INVENTION

The present invention relates to a computerized system for simplifying and/or specializing existing computer programs to reduce the number of instructions in those programs when only a subset of the program functions are required.

Computer programs are becoming increasingly "bloated," including a large number of instructions that are unused or rarely used. Program bloat can negatively affect not only performance but also security to the extent that increased complexity and size offers more attack targets. One driver of software bloat is so-called "feature creep," a tendency of software programs to include additional functions over time.

Manual inspection of software by a human programmer to rewrite a program on a case-by-case basis to reduce bloat is generally impractical or cost ineffective. Some computerized bloat-reduction systems exist but require substantial manual analysis, which can lead to programs that execute incorrectly.

SUMMARY OF THE INVENTION

The present invention provides a computerized process for reducing program bloat while ensuring the soundness of the resulting program. The process provides for partial interpretation of the program up to a program "neck" that separates a program's configuration logic from its main logic. The partial interpretation provides a set of variable states at the neck that can be reduced to constant values based on a predefined set of desired program functions and propagated through the program. The constant-value propagation reveals program that can be eliminated through optimizing transformations. The result is a shorter and substantially simpler program.

More specifically, the invention provides an apparatus for producing compact program versions having at least one computer processor and a memory coupled to the at least one processor holding a stored program executable by the computer processor to: (a) receive a program implementing multiple functions and a description of a desired subset of functions less than the set of the multiple functions; (b) identify a neck of the program dividing configuration instructions from main logic instructions; (c) partially interpret the program to the neck to establish concrete values of variables at the neck; (d) propagate the concrete values through the main logic instructions; and (e) simplify the program by removing instructions of the main logic instructions that will never execute based on the propagated concrete values.

It is thus a feature of at least one embodiment of the invention to make use of a known limited set of desired functions to identify additional variables in the program that are "effectively" constant, allowing new opportunities for program simplification.

The partial interpretation can be achieved by symbolic execution up to the neck to establish concrete representations of the variable states, and (d) using the concrete representations and the desired subset of functions to perform the constant conversion.

It is thus a feature of at least one embodiment of the invention to exploit the power of symbolic execution to identify effective constant values in the program while managing the problems ordinarily associated with symbolic execution by constraining the symbolic execution to the configuration section of the program above the neck.

The simplification may perform optimizing transformations using the concrete values.

It is thus a feature of at least one embodiment of the invention to combine techniques for partial interpretation and for performing optimizing transformations to exploit the strengths of each approach. The partial interpretation allows robust identification of new variables that are effectively constant, increasing the opportunities for program simplification through optimizing transformations.

The optimization phase may employ at least one applications of loop unrolling and function in-lining. In some cases, the optimizing transformations may exclude instructions of branches conditioned on expressions for which constant propagation has established that the instruction branch would never be executed.

It is thus a feature of at least one embodiment of the invention to leverage known techniques of program optimization used during compilation for program simplification.

The program may provide command-line switch inputs, and the desired subset of functions may be a list of switch inputs associated with functions in the desired subset of functions.

It is thus a feature of at least one embodiment of the invention to provide a list of desired functions by exploiting the command-line switch structure of the program.

The neck may be identified as a portion of the program that (i) will execute once and only once for any combination of functions of the subset; and (ii) is an articulation point in the control flow graph of the program that dominates all subsequent instructions.

It is thus a feature of at least one embodiment of the invention to provide a system that can be performed automatically by a computer using techniques of control-flow-graph construction and the like.

The neck may further be identified as a portion of the program that is the closest instruction to the beginning of the program for instructions that satisfy (i) and (ii) and at a location that minimizes the number of instructions in a simplified version of the program.

It is thus a feature of at least one embodiment of the invention to permit optimization in the event that there are multiple possible neck instructions.

These particular objects and advantages may apply to only some embodiments falling within the claims and thus do not define the scope of the invention.

BRIEF DESCRIPTION OF THE DRAWINGS

FIG. 5 is a pseudocode representation of an optional program simplification technique.

DETAILED DESCRIPTION OF THE PREFERRED EMBODIMENT

Figure 1:
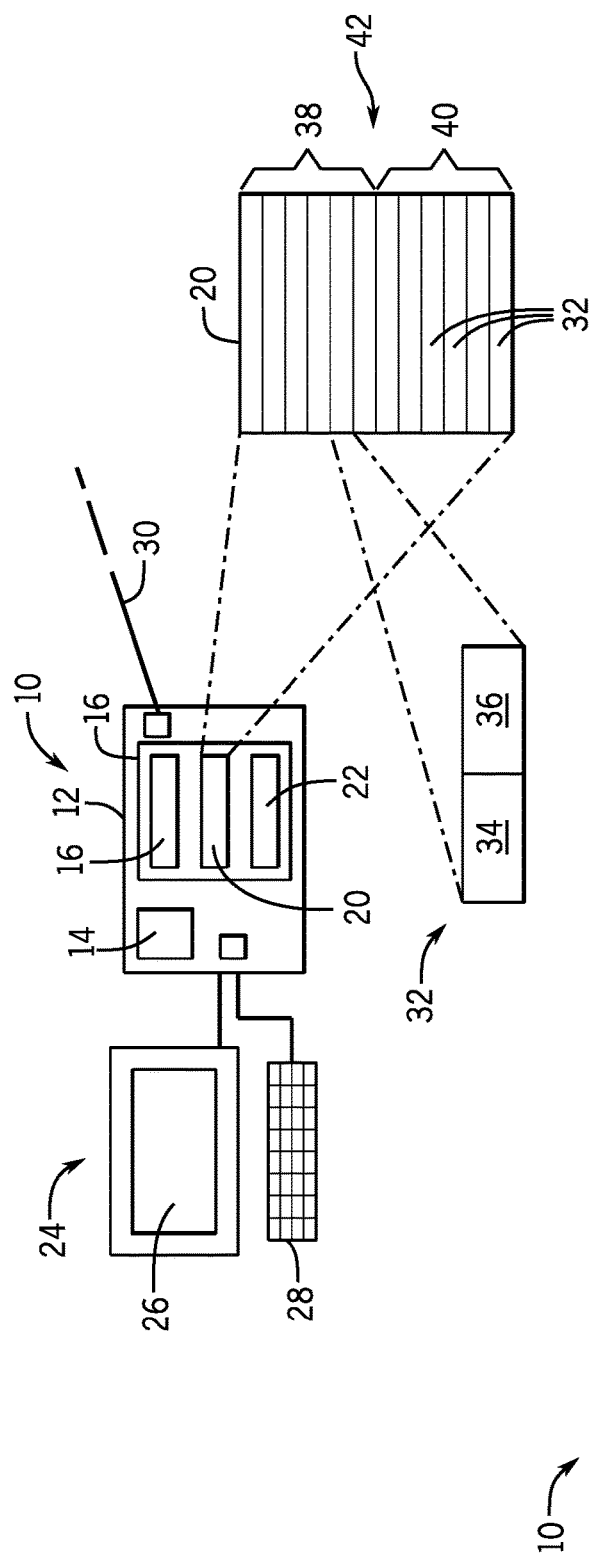
FIG. 1 is a simplified block diagram of an electronic computer suitable for practice of the present invention.

Referring now to FIG. 1, a computer system 10 suitable for use with the present invention may provide an electronic computer 12 including one or more processors 14 communicating with a computer memory 16 variously including combinations of random-access memory, read-only memory, hard disk storage, etc.

The computer memory 16 may hold a program 18 implementing the simplification process of the present invention, as well as a program 20 to be simplified and various data files 22 to be discussed below and interim versions of the program 20 including a final simplified version. Generally the electronic computer 12 may communicate with user-interface hardware 24 such as a display screen 26 and keyboard 28 for receiving user commands and outputting information to the user as may be required by the invention and may provide for network connections 30, for example, communicating with remote storage, printers, or other computers, for example, for the receiving of the program 20 to be simplified and for outputting or transmitting a final simplified program.

Generally, the program 20 will comprise multiple instructions 32. As is understood in the art, the instructions 32 may describe arithmetic or logical steps to be executed by the processor 14 in an operator portion 34 and provide data values serving as the arguments for those operations in a data portion 36. As is generally understood in the art, the data portion 36 may hold a static constant value or may be a variable value, for example, contained in a register address or other memory location referenced by the data portion 36.

The program 20 may be usefully divided into a configuration section 38 and a main logic section 40 separated by a neck 42 as will be discussed in greater detail below. In many cases the program 20 will be invoked, either by a user or another program, with a command line or other input providing a set of switches describing a configuration of the program 20 with respect to functions to be performed by the program 20 and an identification of source data on which the program 20 may operate. The configuration section 38 parses this input, and the main logic section 40 implements the desired functions.

Figure 2:
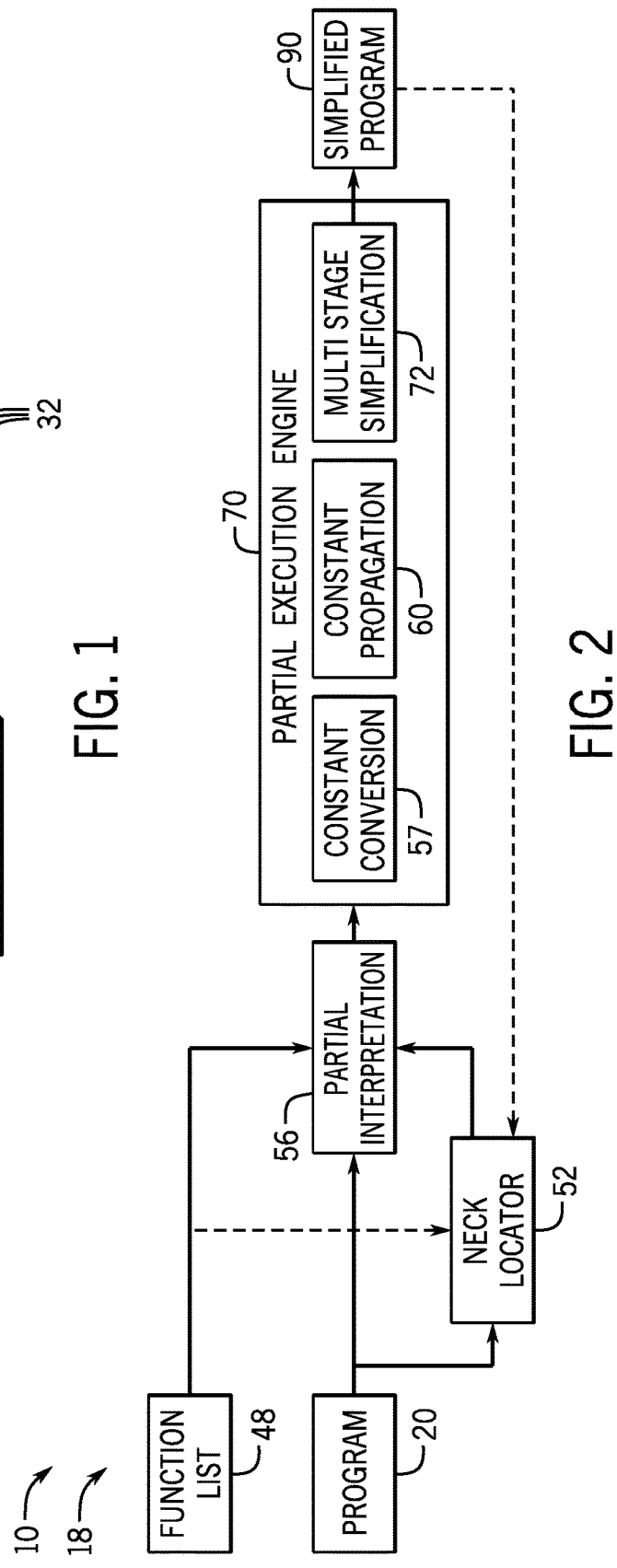
FIG. 2 is a process flow chart showing the steps of the present invention in producing a simplified program.
Figure 3:
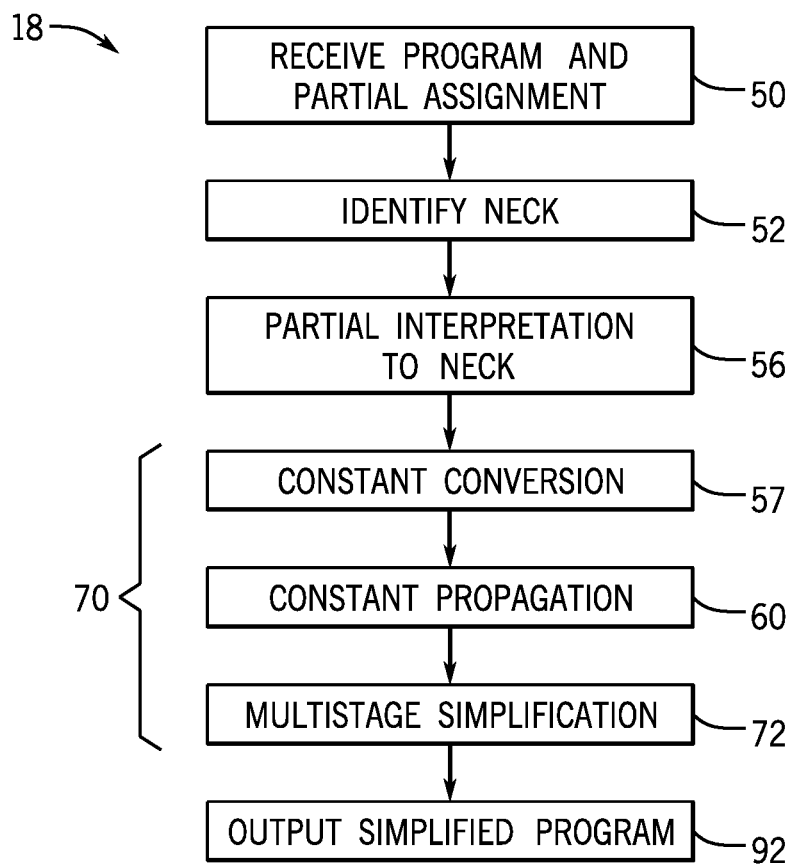
FIG. 3 is a flowchart depicting detailed steps of the various blocks of FIG. 2.

Referring now to FIGS. 2 and 3, the program 18 executing on the computer system 10, per process block 50, may first receive the program 20 for simplification, together with a partial assignment or function list 48 indicating a limited set of functions to be performed by a desired simplified version of the program 20. The function list 48, in one example, may be values of the command-line inputs associated with switches (typically Boolean values) describing the function of the program 20 to be switched on or off.

A simple example program 20 is provided in Table I below having a set of instructions 32 associated with line numbers for convenient reference. This program is a simplified version of the UNIX word-count program providing either of two functions of a word count or line count of a text file. In this case, the text file is obtained from the UNIX standard input in chunks of up to 1023 characters, using the file-reading command "fgets(buffer, 1024 stdin)". A command line providing inputs to the program 20 will generally be of the form: wc (–l) (–c), where "wc" invokes the program, and –l and –c are optional configuration switches (indicated by the parentheses and also called "supplied inputs") that instruct the program 20 to count either lines or characters respectively. (The text file on which the counting is performed—i.e., stdin—is called a "delayed input.)

TABLE 1

| 1 | struct Flags { |
| 2 | char count_chars; |
| 3 | int count_lines; }; |
| 4 | int total_lines = 0; |
| 5 | lint total_chars = 0; |
| 6 | int main(int argc, char** argv){ |
| 7 | struct Flags *flag; |
| 8 | flag = malloc(sizeof(struct Flags)); |
| 9 | flag->count_chars = 0; |
| 10 | flag- >count_lines = 0; |
| 11 | if (argc >= 2) { |
| 12 | for (int i = 1; i < argc; i++) { |
| 13 | if (!strcmp(argv[i], "-c")) flag->count_chars = 1; |
| 14 | if (!strcmp(argv[i], "-l")) flag->count_lines = 1; }} |
| 15 | char buffer[1024]; |
| 16 | while (fgets(buffer, 1024,stdin)) { |
| 17 | (flag->count_chars) total_chars += decodeChar(buffer); |
| 18 | if (flag->count_lines) total_lines++;} |
| 19 | if (flag->count_chars) printf("#Chars = %d", total_chars); |
| 20 | if (flag->count_lines) printf("#Lines = %d", total_lines); } |

In this example, the function list 48 may be defined by the switch values of the complete set of switch values associated with the program 20 as would be provided in the command line, for example, indicating a desire only that the program be able to do line counting only (e.g., "wc-l").

Referring still to FIGS. 1-3, at process block 52, after receiving the program 20 and a function list 48, the neck 42 of the program 20 is identified. The step of identifying the neck 42 the program 20 defines the instructions 32 of the configuration section 38 and a main logic section 40, discussed above, where the configuration section 38 parses the program inputs (e.g., the switches) and the main logic section implements the functions that are desired. By identifying the configuration section 38, opportunities for finding effective constant values in the data portions 36 of instructions 32 resulting from the switch settings are maximized while additional steps of the program 18 to be described below, including optimizing transformations, are made more tractable.

Figure 4:
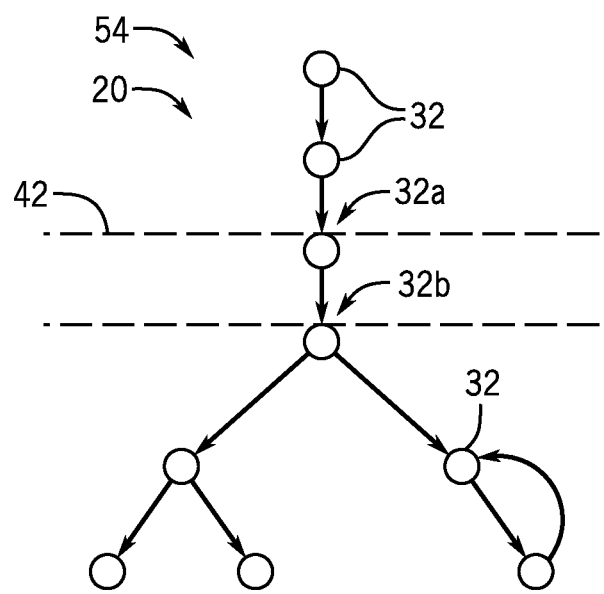
FIG. 4 is a simplified control flow graph illustrating the steps of identifying the neck.

Referring now also to FIG. 4, in general, the neck 42 is identifiable by searching for an instruction 32 satisfying the conditions of: (i) the instruction 32 executing once and only once for any combination of functions of the function list 48; and (ii) the instruction 32 being an articulation point 58 in the control flow graph 54 of the program 20 that dominates all subsequent instructions 32. An articulation point will be an instruction which, if removed, disconnects other instructions and dominates if the program must pass through that instruction in any possible path to later instructions. Generally, condition (i) means that the identified instruction 32 is not in a loop and is reachable from the entry node (i.e., instruction 32 is connected by the control flow graph to the entry node).

In the event that multiple instructions 32a and 32b satisfy (i) and (ii), one of those instructions is selected as the neck 42 by minimizing an objective function combining distance between that instruction 32 and the start of the program 20

(for example, along the control flow graph) and the number of instructions in the ultimately simplified program as will be discussed below. This process can be performed iteratively with the set of candidate instructions 32. The generation of the control flow graph and analysis of the control flow graph may be conducted by the computer, or the neck 42 may be identified by the computer through user input. A control flow graph can be generated by the LLVM compiler infrastructure as discussed below In the example program 20 of Table I above, the neck 42 occurs at instruction 15, separating the configuration section 38 from the main logic section 40, the latter including instruction 15.

Referring again to FIGS. 2 and 3, at succeeding process block 56, the program 18 uses the identified neck 42 from process block 52 to perform a partial interpretation of the program 20 up to the neck 42. As used herein, the term "partial interpretation" refers to the execution of a program starting with an initial state that has both known and unknown values, and performs as much execution as possible (propagating through the program a state—or in some cases states—with known and unknown values). The known values are the supplied inputs and the values of other variables of the program that can be evaluated during the program's execution knowing only the supplied inputs; the unknown values are the delayed inputs and the values of other variables of the program that cannot be evaluated because they depend (directly or transitively) on the values of one or more delayed inputs.

In one example, the partial interpretation may make use of symbolic execution. Symbolic execution is an execution that recognizes that the values of many variables used by the instructions 32 will not be known until run-time, and accordingly resolves those instructions by creating a symbolic expression that has a placeholder for each unknown variable's value. In one embodiment, this symbolic evaluation may make use of the open-source Klee Symbolic Execution Engine built on top of the LLVM compiler infrastructure. When used in a fully general manner, symbolic execution can become unwieldy for large programs, and thus using the neck 42 to constrain this execution greatly improves the tractability of this process. It will be understood that alternative types of partial interpretation can be performed, for example, by instrumenting the program or the like.

At the conclusion of process block 56, a set of symbolic expressions of the variable states of the data portion 36 of the instructions 32 at the neck 42 are known and used to map the supplied inputs of the configuration switches (representing the limited desired functionality) to a set of concrete values at the neck 42 per process block 57. The delayed inputs are not used as part of this process but will be used later in executing the final, resulting simplified program.

These concrete values are not static constants in the program 20 but may be considered constant based on the function list 48. The concrete values will be propagated both upstream and downstream from the neck 42 (per process block 60) to identify additional instances of these effective constant values as a first step of applying optimizing transformations 70 to the program 20. In the example of Table I, these effective constant values are as indicated in the following Table II.

TABLE II

| Variable | Type | Scope | Value |
|---|---|---|---|
| total_lines | int | Global | 0 |
| total_chars | | | 0 |

TABLE II-continued

| Variable | Type | Scope | Value |
|---|---|---|---|
| flag->count_lines | int char | Local | 1 |
| flag->count_chars | | | 0 |

Generally, the constant-propagation process of process block 60 maps the variables of the data portions 36 of the instructions 32 to their effective constant values including global and stack variables (base-type, struct, and pointer variables) iterating over the instructions to identify the locations where the variables are accessed, which is indicated by load instructions. Then, it replaces the loaded value with the corresponding constant value.

For pointers to base variables, it is necessary to identify locations where the pointer is modifying a base variable (by looking for store instructions whose destination-operand type is a pointer to a base type). The source operands of the store operations are then replaced with the constant value corresponding to the actual base variable pointed to by the pointer.

For stack variables that are Structs and pointers to Structs, the memory address that is pointed to by these variables is identified using GEPInstr (of LLVM discussed above), which facilitates tracing back to finding the corresponding Struct and pointer-to-Struct variables. Iteration is then performed over the occurrences of GEPInstr by leveraging the method "users ( )" in the LLVM compiler infrastructure to identify store operations that modify the variables. Finally, the source operand of the store operation is converted to the appropriate constant. The element index recorded during the partial interpretation is used to identify which Struct element should be converted.

For string variables, an array of characters is created, based on the captured constant string value during the partial interpretation. This array is assigned to the corresponding string variable.

In the example program of Table I, no replacements are performed for global variables "total_lines" and "total_chars" before the neck 42 because there are no such occurrences. Replacements are performed for referents of the pointer-to-Struct flag: the occurrences of "flag→count_chars" and "flag→countlines" at lines 13 and 14 are replaced with the corresponding values listed in Table II.

Referring still to FIGS. 2 and 3, at process block 72 multiple stages of simplification are implemented using standard compiler-optimization techniques and including function in-lining, loop unrolling, constant folding, removal of branch instructions that are always true or always false in the associated branch, removal of unreachable instructions, removal of uncalled functions, and the like.

In one embodiment, a cleanup step may follow the pseudocode provided in FIG. 5. Initially, the cleanup removes two categories of functions: (i) those that are called only from call-sites before the neck 42, but not called during the partial interpretation (Lines 4-6), and (ii) those that are never called from the set of functions transitively reachable from main (the neck 42), including indirect call-sites (Lines 7-10). Function removal is performed after constructing the call graph at Line 3. To handle indirect call sites, the process of FIG. 5 also checks the number of uses of a function at Lines 5 and 8 before removing the node. This check prevents the removal of a function invoked via a function pointer.

Next, the program 18 of FIG. 5 shifts to simplifying the remaining functions of program 20. For removing global variables (Lines 12-14), it iterates over the list of global variables obtained through the LLVM API function getGlobalList, and removes unused variables. Finally, stack variables are removed (Lines 16-23), including initialized but unused variables by iterating over the remaining functions and erasing unused allocation instructions. (In general, standard LLVM simplifications do not remove a stack variable that is initialized but is not otherwise used because the function contains a store operation that refers to the variable. The clean-up pass removes an initialized-but-unused variable by deleting the store instruction, and then the allocation instruction.)

A final simplified program 90 is an output per process block 92 as follows:

TABLE III

| | |
|---|---|
| 1 | struct Flags { |
| 2 | char count_chars; |
| 3 | int count_lines; }; |
| 4 | int total_lines = 0; |
| 5 | int main(int argc, char** argv){ |
| 6 | struct Flags *flag; |
| 7 | flag = malloc(sizeof(struct Flags)); |
| 8 | char buffer[1024]; |
| 9 | while (fgets(buffer, 1024,stdin)) { |
| 10 | total_lines++; } |
| 11 | printf("#Lines = %d", total_lines); } |

The simplification steps remove the tests at Lines 18 and 20 (of Table I) because the values of the conditions are always true. Because the values of the conditions in the tests at Lines 17 and 19 (of Table I) are always false, control-flow simplification removes both the tests and the basic blocks in the true-branches. Furthermore, the removal of these basic blocks all uses of the global variable total_chars, and thus the cleanup step removes it as an unused variable.

The resulting program 90 may then be used in lieu of the original program 20 to provide faster execution, reduce storage requirements, and possibly reduced attack vectors for malware. This resulting program 90 may be subsequently used with both supplied and delayed inputs.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processors can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. An apparatus for producing compact program versions comprising:
    at least one computer processor; and
    a memory coupled to the at least one processor holding a stored program executable by the at least one computer processor to:
    (a) receive a program implementing multiple functions and a separate pre-determined identification of a desired subset of functions less than the set of the multiple functions;
    (b) identify a neck of the program dividing configuration instructions from main logic instructions;
    (c) partially interpret the program to the neck to establish concrete values of selected variables at the neck, the selected variables selected according to the pre-determined identification of a desired subset of functions;
    (d) propagate the established concrete values through the main logic instructions; and
    (e) simplify the program by removing instructions of the main logic instructions that will never execute to implement the desired subset of functions based on the propagated concrete values.

2. The apparatus of claim 1 wherein (c) uses symbolic execution up to the neck to establish concrete representations of the variable states, and (d) uses the concrete representations and the desired subset of functions to perform the constant conversion.

3. The apparatus of claim 1 wherein (e) performs optimizing transformations using the concrete values.

4. The apparatus of claim 3 wherein the optimizing transformations employ at least one of loop unrolling and function in-lining.

5. The apparatus of claim 1 wherein the removed instructions include instruction branches conditioned on expressions which will never be executed based on the propagated concrete values.

6. The apparatus of claim 1 wherein the program is parameterized by command-line switch inputs, and the desired subset of functions is specified by a list of switch inputs associated with the desired subset of functions.

7. The apparatus of claim 6 wherein (c) uses partial interpretation to convert the switch inputs to the concrete values.

8. The apparatus of claim 1 further including: (f) outputting a simplified version of the program.

9. The apparatus of claim 1 wherein the neck is identified as a portion of the received program:
   (i) that will execute once and only once for any combination of functions of the subset; and
   (ii) is an articulation point in a control flow graph of the program that dominates all subsequent instructions.

10. An apparatus for producing compact program versions comprising:
   at least one computer processor; and
   a memory coupled to the at least one processor holding a stored program executable by the at least one computer processor to:
   (a) receive a program implementing multiple functions and a description of a desired subset of functions less than the set of the multiple functions;
   (b) identify a neck of the program dividing configuration instructions from main logic instructions;
   (c) partially interpret the program to the neck to establish concrete values of variables at the neck;
   (d) propagate the concrete values through the main logic instructions; and
   (e) simplify the program by removing instructions of the main logic instructions that will never execute based on the propagated concrete values,
   wherein the neck is identified as a portion of the received program:
   (i) that will execute once and only once for any combination of functions of the subset; and
   (ii) is an articulation point in a control flow graph of the program that dominates all subsequent instructions; and
   wherein the neck further is identified as a portion of the program:
   (iii) that is a closest instruction to a beginning of the program for instructions that satisfy (i) and (ii) and minimizes a number of instructions in the simplified program.

11. A method for producing compact program versions using an electronic computer comprising using the electronic computer to:
   (a) receive a program implementing multiple functions and a description of a desired subset of functions less than the set of the multiple functions;
   (b) identify a neck of the program dividing configuration instructions from main logic instructions;
   (c) partially interpret the program to the neck to establish concrete values of variables at the neck;
   (d) propagate the concrete values through the main logic instructions; and
   (e) simplify the program by removing instructions of the main logic instructions that will never execute based on the propagated concrete values;
   wherein the neck is identified as a portion of the program:
   (i) that will execute once and only once for any combination of functions of the subset; and (ii) is an articulation point in a control flow graph of the program that dominates all subsequent instructions; and
   wherein the neck further is identified as a portion of the program that: (iii) is a closest instruction to the beginning of the program for instructions that satisfy (i) and (ii) and minimizes a number of instructions in the simplified program.

12. The method of claim 11 wherein (c) uses symbolic execution up to the neck to establish concrete representations of the variable states, and (d) uses the concrete representations and the desired subset of functions to perform the constant conversion.

13. The method of claim 11 wherein (e) performs optimizing transformations using the concrete values.

14. The method of claim 13 wherein the optimizing transformations employ at least one of loop unrolling and function in-lining.

15. The method of claim 11 wherein the removed instructions include instruction branches conditioned on expressions which will never be executed based on the propagated concrete values.

16. The method of claim 11 wherein the program is parameterized by command-line switch inputs, and the desired subset of functions is specified by a list of switch inputs associated with the desired subset of functions.

17. The method of claim 16 wherein (c) uses partial interpretation to convert the switch inputs to the concrete values.

18. The method of claim 11 further including (f) outputting a simplified version of the program.

* * * * *